March 7, 1950
C. HOLLERITH
2,499,585
BRAKE STRUCTURE
Filed April 22, 1946
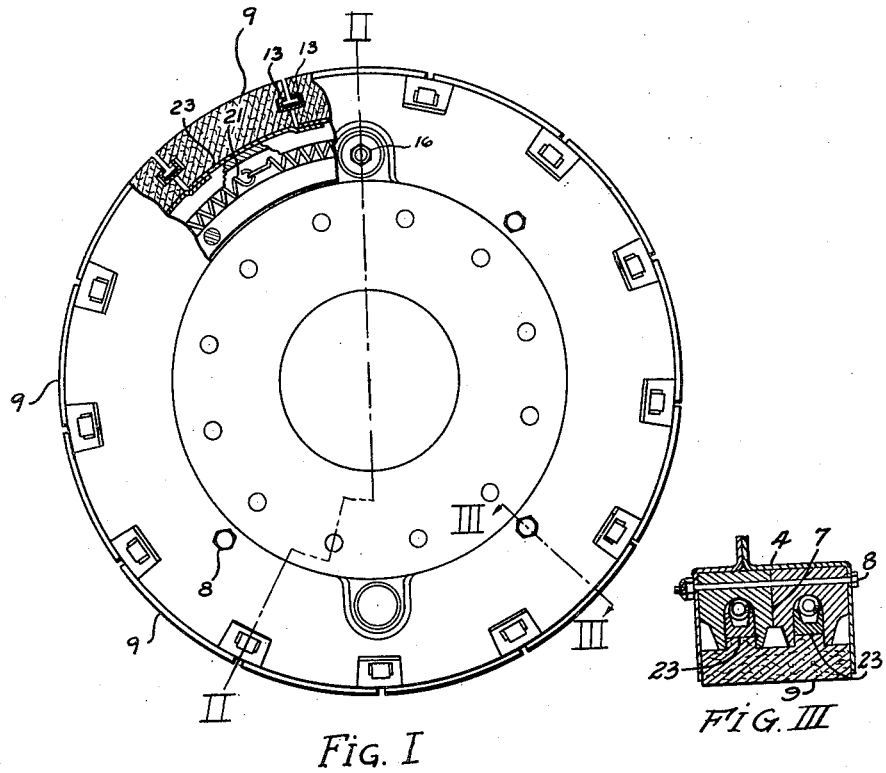
Fig. I
Fig. III
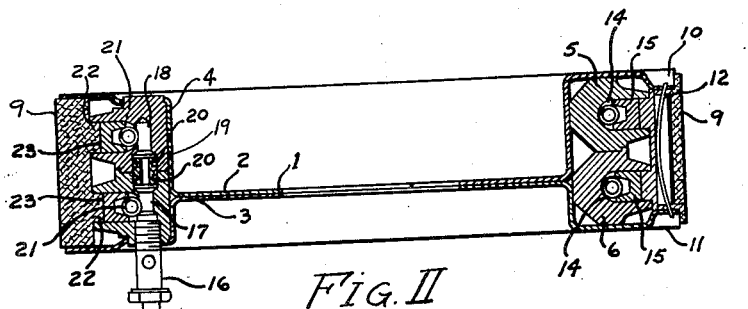
Fig. II
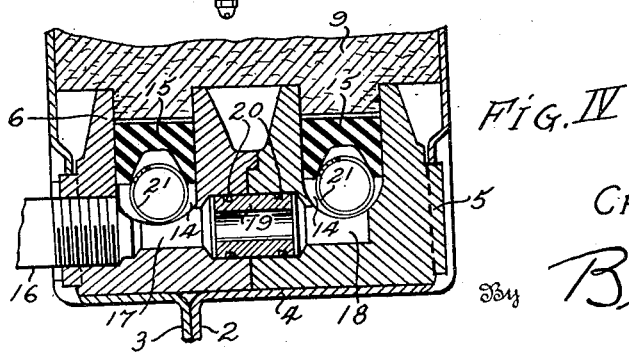
Fig. IV
Inventor
CHARLES HOLLERITH
By Beaman + Langford
Attorneys Patented Mar. 7, 1950

2,499,585

UNITED STATES PATENT OFFICE 2,499,585

BRAKE STRUCTURE

Charles Hollerith, Jackson, Mich., assignor, by mesne assignments, to The B. F. Goodrich Company, Akron, Ohio, a corporation of New York Application April 22, 1946, Serial No. 663,993

5 Claims. (Cl. 188—152)

The present invention relates to an improvement in brakes and particularly to improvements in high pressure hydraulic brakes of the type in which a radially expanding element acts upon a brake block or its equivalent to radially move the same into engagement with a brake drum.

The invention constitutes particularly an improvement over the construction disclosed in my co-pending application Serial No 526,698, filed March 16, 1944, now Patent No. 2,423,315, dated July 1, 1947. The structure in said copending application discloses a cast ring on which brake blocks are supported and in which is disposed a radially outwardly movable actuator for the brake blocks. According to the present invention the cast ring is made of two parts having novel form and associated structure.

An object of the present invention is to provide a brake structure having a peripheral support for brake blocks, said peripheral support being of two parts.

Another object of the invention is to provide a peripheral support for brake blocks wherein there are provided communicating ports for conducting fluid pressure, said communicating ports being connected by a telescoping connecting sleeve therein.

Another object of the invention is to provide an improved connector for communicating ports in separate members.

These and other objects residing in arrangement, combination and construction of the parts will be apparent from the following specification and claims when taken with the accompanying drawing, in which Fig. 1 is a side elevation of the invention partly broken away to show detail, Fig. 2 is a section on the line II—II of Fig. 1, Fig. 3 is a section on the line III—III of Fig. 1 and Figure 4 is a fragmentary section showing the telescoping connecting sleeve and associated port structure on an enlarged scale.

Referring particularly to the drawing, the reference character 1 indicates a torque spider constructed of two sheet metal members 2 and 3 which are formed at their peripheries to provide a channel 4. The channel 4 supports therein two contiguous rings 5 and 6 which are provided with interlocking shoulders 7. A plurality of circumferentially spaced bolts 8 extend through the channel 4 and the rings 5 and 6 to secure the same together.

There are mounted on the periphery of the rings 5 and 6 a plurality of brake blocks 9 of the character disclosed in my aforesaid co-pending application and more particularly in my Patent No. 2,350,038, issued May 30th, 1944. The sides of the channel 4 are provided with depressed portions 10 and 11 at which are anchored springs 12 extending through slots 13 in the ends of the brake blocks 9 for anchoring the brake blocks 9 in the channels 4 and for resiliently holding the brake blocks 9 inwardly, all as disclosed in my aforesaid patent.

The brake blocks 9 are urged radially outwardly by a sealing ring 15 preferably of rubber, either natural or synthetic, under the action of hydraulic fluid under pressure. Hydraulic fluid under pressure is introduced through a coupling 16 which communicates through ports 17 and 18 in the rings 6 and 5 respectively. Ports 17 and 18 communicate with the channels 14 as shown particularly in Fig. 2. A helical spring 21 in each channel 14 and inwardly of the sealing ring 15 maintains a space at the inner sides of the channels 14 so as to provide at all times a clear passage for hydraulic fluid therein.

The brake blocks 9 are provided with annular radially inwardly extending ring portions 22 which project into the channels 14. Inwardly of the ring portions 22 are disposed a plurality of circumferentially aligned and overlapping strips of metal 23 to afford a continuous surface for the sealing ring 15 to bear against so that they will not tend to extrude into the spaces between the brake blocks 9.

A particular feature of the invention is the connecting sleeve 19 between the ports 17 and 18. The sleeve 19 is provided with sealing rings 20 mounted in annular grooves in the parts thereof in telescoping relation with the respective ports 17 and 18. The sleeve 19 affords a leak-proof connector between the ports 17 and 18. It will be observed that the ports 17 and 18 are provided with radially enlarged sections for receiving the sleeve 19 so as to limit the telescoping motion thereof with respect to the ports 17 and 18.

The invention has been disclosed particularly as related to a specifically described form of brake structure. It is to be understood that not only is it not limited to brake structure, but also may have even wider application.

Having thus described my invention, what I desire to secure by Letters Patent and claim is:

1. A radial brake assembly comprising a main peripheral portion, a radially expansible and contractible brake element supported on said peripheral portion, said portion including a pair of contiguous means each defining a narrow radially walled channel opening radially outward and being directly adjacent to and briged by said brake element, an annular sealing means supported in each of said channels and adapted to be radially displaced therein, means for directing fluid pressure into said channels against said sealing means to radially displace the same in said channels to force said brake element outwardly, said means comprising communicating ports in each of said first named means, and a connecting sleeve telescoped in each port for providing a continuous passage from one port to the other.

2. The invention as defined in claim 1 wherein there is provided sealing means between each of the ports and the connecting sleeve.

3. A brake assembly of the character described comprising a radially expansible and contractible brake element and a peripheral portion supporting the same, said portion including a pair of contiguous rings, means securing said rings together, said rings having grooves formed in the peripheries thereof, resilient elastic sealing rings positioned in said grooves, and means to introduce fluid pressure into said grooves behind said sealing means to force the same radially outwardly to move said brake element, said introducing means comprising communicating ports in said rings, a connecting sleeve telescoped into each of said ports for providing a continuous passage from one port to the other, and sealing means between said ports respectively and said sleeve.

4. In a brake of the character described, a plurality of brake blocks adapted to be moved radially outwardly, means to move said brake block radially outwardly comprising a pair of cylindrical members secured in contiguous relation affording a backing for said brake block, each cylindrical member having an annular groove therein facing outwardly, resilient annular sealing means disposed in said grooves, and means to introduce fluid pressure into said grooves behind said sealing means to force the same radially outwardly to move said brake blocks, said introducing means comprising communicating ports in said cylindrical members, a connecting sleeve freely telescoped into each of said ports for providing a continuous passage from one port to the other, and sealing means between said ports respectively and said sleeve.

5. A brake structure comprising a pair of annular body members in side by side contiguous relation, each having a fluid confining chamber, brake actuating means operated by fluid pressure within said chambers, said brake body members having axially aligned passages for transmission of pressure fluid from one to the other, each said passage having an enlarged end portion, said enlarged ends being in axial contiguous relation and defining a common enlarged passageway intermediate the outer ends of said aligned passages, and a connecting sleeve fitted into said enlarged common passage and extending past the joint between said members for providing a continuous passage therebetween.

CHARLES HOLLERITH.

REFERENCES CITED

The following references are of record in the file of this patent:

UNITED STATES PATENTS

| Number | Name | Date |
|---|---|---|
| 1,484,355 | Moir | Feb. 19, 1924 |
| 2,154,497 | Durham | Apr. 18, 1939 |
| 2,174,724 | Hunter | Oct. 3, 1939 |
| 2,203,862 | Eason | June 11, 1940 |
| 2,213,383 | Canfield | Sept. 3, 1940 |
| 2,324,688 | Finlayson | July 20, 1943 |
| 2,401,488 | Lewis | June 4, 1946 |
| 2,410,029 | Hollerith | Oct. 29, 1946 |
| 2,423,315 | Hollerith | July 1, 1947 |

FOREIGN PATENTS

| Number | Country | Date |
|---|---|---|
| 42,060 | Germany | of 1888 |